United States Patent
Hosaka

(10) Patent No.: US 8,138,466 B2
(45) Date of Patent: Mar. 20, 2012

(54) VIDEO SIGNAL PROCESSING APPARATUS AND METHOD WITH INFRARED COMPONENT REMOVER

(75) Inventor: Hajime Hosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 12/121,069

(22) Filed: May 15, 2008

(65) Prior Publication Data

US 2008/0283729 A1    Nov. 20, 2008

(30) Foreign Application Priority Data

May 15, 2007    (JP) ............................... P2007-128735

(51) Int. Cl.
*G01J 3/50*    (2006.01)
(52) U.S. Cl. ................ 250/226; 250/208.1; 250/339.05; 250/341.8; 348/273; 348/274; 348/275; 348/276
(58) Field of Classification Search .............. 250/208.1, 250/226, 339.01, 339.02, 339.05, 341.8, 250/370.08; 348/273–276
See application file for complete search history.

(56) References Cited

U.S. PATENT DOCUMENTS

| | | | |
|---|---|---|---|
| 6,211,521 B1 | 4/2001 | Bawolek et al. | |
| 6,292,212 B1* | 9/2001 | Zigadlo et al. | ................ 348/33 |
| 6,580,459 B2 | 6/2003 | Uchino et al. | |
| 6,657,663 B2* | 12/2003 | Morris | ........................ 348/273 |
| 6,825,470 B1 | 11/2004 | Bawolek et al. | |
| 2003/0025796 A1 | 2/2003 | Yamagishi | |
| 2003/0112353 A1 | 6/2003 | Morris | |
| 2004/0184548 A1* | 9/2004 | Kerbiriou et al. | ........ 375/240.28 |
| 2006/0261280 A1 | 11/2006 | Oon et al. | |
| 2007/0153099 A1* | 7/2007 | Ohki et al. | ..................... 348/234 |
| 2007/0187794 A1* | 8/2007 | Fukuyoshi et al. | ........... 257/440 |
| 2008/0049115 A1 | 2/2008 | Ohyama et al. | |
| 2008/0079806 A1* | 4/2008 | Inuiya et al. | .................... 348/65 |
| 2009/0009621 A1* | 1/2009 | Yamaguchi et al. | ........ 348/222.1 |

FOREIGN PATENT DOCUMENTS

| | | |
|---|---|---|
| JP | 1999-018033 | 1/1999 |
| JP | 11-144031 | 5/1999 |
| JP | 1999-144031 | 5/1999 |
| JP | 2002-084451 | 3/2002 |
| JP | 2004-56343 | 2/2004 |
| JP | 2004-056343 | 2/2004 |
| JP | 2002-084451 | 3/2004 |
| JP | 2005-006066 | 1/2005 |
| JP | 2005-323141 | 11/2005 |

(Continued)

*Primary Examiner* — Georgia Y Epps
*Assistant Examiner* — Kevin Wyatt
(74) *Attorney, Agent, or Firm* — Finnegan, Henderson, Farabow, Garrett & Dunner, L.L.P.

(57) ABSTRACT

A video signal processing apparatus includes an image sensor and an infrared component remover. The image sensor receives light through a color filter, the color filter including long-pass filters only or a combination of a long-pass filter and an all-transmissive filter. The long-pass filters in the color filter a visible-light transmissive long-pass filter for permitting a visible-light component and an infrared-light component to pass therethrough and an infrared-light transmissive long-pass filter for permitting an infrared-light component to pass selectively therethrough. The infrared-light component remover removes an infrared-light component contained in a signal having passed through the visible-light transmissive long-pass filter, with transmittance data of an infrared-light region of the visible-light transmissive long-pass filter and the infrared-light transmissive long-pass filter applied.

15 Claims, 10 Drawing Sheets

FOREIGN PATENT DOCUMENTS

| | | |
|---|---|---|
| JP | 2007-036545 | 2/2007 |
| JP | 2007-043427 | 2/2007 |
| WO | WO 99/50682 | 10/1999 |
| WO | WO 2006/003807 | 1/2006 |
| WO | WO 2006/134740 | 12/2006 |

* cited by examiner

FIG. 1A

| R | G | R | G |
|---|---|---|---|
| G | B | G | B |
| R | G | R | G |
| G | B | G | B |

FIG. 1B

| Y | G | Y | G |
|---|---|---|---|
| R | Y | B | Y |
| Y | G | Y | G |
| B | Y | R | Y |

FIG. 2

| R | G | R | G |
|---|---|---|---|
| IR (R+B) | B | IR (R+B) | B |
| R | G | R | G |
| IR (R+B) | B | IR (R+B) | B |

FIG. 6

| ALL | Ye +IR | ALL | Ye +IR |
|-----|--------|-----|--------|
| R +IR | ALL | IR | ALL |
| ALL | Ye +IR | ALL | Ye +IR |
| IR | ALL | R +IR | ALL |

FIG. 10

| Ye +IR | ALL | Ye +IR | ALL |
|---|---|---|---|
| Red +IR | Ye +IR | IR | Ye +IR |
| Ye +IR | ALL | Ye +IR | ALL |
| IR | Ye +IR | Red +IR | Ye +IR |

FIG. 11

| ALL | Red +IR | ALL | Red +IR |
|---|---|---|---|
| IR | Ye +IR | IR | Ye +IR |
| ALL | Red +IR | ALL | Red +IR |
| IR | Ye +IR | IR | Ye +IR |

VIDEO SIGNAL PROCESSING APPARATUS AND METHOD WITH INFRARED COMPONENT REMOVER

CROSS REFERENCES TO RELATED APPLICATIONS

The present invention contains subject matter related to Japanese Patent Application JP 2007-128735 filed in the Japanese Patent Office on May 15, 2007, the entire contents of which are incorporated herein by reference.

BACKGROUND OF THE INVENTION

1. Field of the Invention

The present invention relates to an image processing apparatus, an image sensor, a video signal processing method and a computer program. More specifically, the present invention relates to a video signal processing apparatus and an image sensor, each including a color filter composed of a combination of long-pass filters, and a video signal processing method and a computer program.

2. Description of the Related Art

Monitoring cameras and commercial video cameras typically capture visible-light images under visible light condition of natural light during daytime. During nighttime, the cameras typically capture infrared-light images of infrared light reflected from a subject in response to an infrared light beam projected by an infrared light projector. When image capturing is performed under natural light, an infrared-light cut filter is mounted on the camera. When image capturing is performed using infrared light, the infrared-light cut filter is removed. Such a camera is disclosed in Japanese Unexamined Patent Application Publication No. 2002-084451. If the infrared-light cut filter is mechanically removed, a moving portion is attached to mount and demount the filter on an optical system of the cameral, leading to a cost increase of the camera.

In such a filter switching system, the camera operates to capture the infrared-light image or the visible-light image. The camera cannot capture both the infrared-light image and the visible-light image at the same time.

Japanese Unexamined Patent Application Publication No. 2004-056343 discloses a system that performs data communications by means of infrared light. The system receives blinking infrared light responsive to data communications and analyses the received infrared light. The system includes an image sensor to receive the infrared light. Such a system, if provided with a removably attached mechanism for infrared light, cannot receive both the infrared light and picture data in visible light at the same time.

Widely available color filter arrays are illustrated in FIGS. 1A and 1B. FIG. 1A illustrates a color filter array of red (R), green (G) and blue (B). FIG. 1B illustrates a combination of white (Y) as a luminance signal and red (R), green (G) and blue (B). If an attempt is made to capture images with an image sensor having such an array and without infrared-light cut filter under an infrared-light abundant light source, a large amount of infrared light is captured. Color reproduction and image quality are degraded.

Japanese Unexamined Patent Application Publication No. 11-144031 discloses a system that allows each of an infrared light image and a visible light image to be captured. With this system, background is identified using infrared light. A plurality of image sensors are incorporated to capture each of the infrared light image and visible light image in the system, leading to a cost increase.

Concurrent retrieval of infrared-light images and color images typically excellent in color reproduction property are useful in removal of scratches on a film, skin color detection and noise reduction. There is a mounting need for a mechanism that captures both infrared images and color images and processes both the infrared image and the color images.

In one contemplated mechanism for capturing and processing both the infrared image and the color image, an infrared-light component is removed through an image process by adding an infrared-light transmission pixel to a filter of existing color filter array as shown in FIG. 1. However, infrared light of all color components cannot be removed to a sufficient level even if a signal resulting from a pixel derived from an infrared-light transmissive filter is used. This is because filter characteristics of a filter used as a color filter array is not sufficiently close to perfect ones.

The color filter array of pixels in an image sensor is typically a combination of at least one of a plurality of bandpass color filters of blue, green, cyan and magenta, and a long-pass color filter of red or yellow. Each bandpass filter permits light in a predetermined wavelength region (band). Each long-pass filter permits light above a predetermined wavelength. The color filter discussed with reference to FIG. 1 is composed of such bandpass filters and long-pass filter. Ideally, each bandpass filter permits only light falling within a predetermined wavelength range needed for color reproduction to pass therethrough while blocking the remaining light having a wavelength longer and shorter than the predetermined wavelength range.

Most of materials of the bandpass filters on the color filter array function as a bandpass filter only in a visible-light wavelength range. Most of the materials of the bandpass filter permit partially the infrared light to pass therethrough, thereby failing to function as a bandpass filter within the infrared light range as invisible light. Transmission characteristics of the infrared light passing through the bandpass filter change depending on the type of each bandpass filter.

In one related art, the infrared-light component is removed based on a signal captured using a bandpass filter. In this technique, received infrared light is calculated with an infrared light transmission pixel added to a color filter array. An amount of infrared light having passed through each bandpass filter is estimated, and the infrared-light component is removed based on the estimation results.

The filter used to obtain the infrared-light transmission pixel is a long-pass filter and transmissive characteristics of the filter in infrared light in a pass band remain constant regardless of wavelength. On the other hand, infrared light transmissive characteristics of each bandpass filter that permits one of blue, green, cyan, magenta light to pass selectively are different depending on each bandpass filter. It is thus difficult to remove accurately only the infrared-light component from the bandpass filter different in filter characteristics using the signal alone acquired from the infrared light transmission pixel. Infrared light removal performance required to capture a color image having excellent color reproduction property cannot be obtained.

SUMMARY OF THE INVENTION

It is thus desirable to acquire both an infrared image and a color image and generate a color image free from an infrared-light component and excellent in color reproduction property.

In accordance with one embodiment of the present invention, a video signal processing apparatus, includes an image sensor and an infrared component remover. The image sensor receives light through a color filter. The color filter includes long-pass filters only or a combination of a long-pass filter and an all-transmissive filter. The long-pass filters includes a visible-light transmissive long-pass filter for permitting a visible-light component and an infrared-light component to pass therethrough and an infrared-light transmissive long-pass filter for permitting an infrared-light component to pass selectively therethrough. The infrared-light component remover removes an infrared-light component contained in a signal having passed through the visible-light transmissive long-pass filter, with transmittance data of an infrared-light region of the visible-light transmissive long-pass filter and the infrared-light transmissive long-pass filter applied.

The infrared-light component remover may calculate a parameter that reduces to approximately zero the infrared-light component contained in the signal having passed through the visible-light transmissive long-pass filter, with the transmittance data of the infrared-light region of the visible-light transmissive long-pass filter and the infrared-light transmissive long-pass filter applied. The infrared-light component remover may generate, with the calculated parameter applied, a color signal being a visible-light component that is obtained by removing the infrared-light component the signal having passed through the visible-light transmissive long-pass filter.

Each of the visible-light transmissive long-pass filter and the infrared-light transmissive long-pass filter, forming the color filter, has a substantially constant transmittance in the infrared-light region.

The color filter may include a long-pass filter for permitting light in a visible-light region and an infrared-light region to pass therethrough with only an ultraviolet-light component cut off, a long-pass filter for permitting light in the visible-light region equal to or longer than a yellow light wavelength and the infrared-light region to pass therethrough, a long-pass filter for permitting light in the visible-light region equal to or longer than a red light wavelength and the infrared-light region to pass therethrough and an infrared-light transmissive long-pass filter for permitting light mainly in the infrared-light region to pass therethrough.

The color filter may include an all-transmissive filter for permitting light in a visible-light region and an infrared-light region to pass therethrough, a long-pass filter for permitting light in the visible-light region equal to or longer than a yellow light wavelength and the infrared-light region to pass therethrough, a long-pass filter for permitting light in the visible-light region equal to or longer than a red light wavelength and the infrared-light region to pass therethrough and an infrared-light transmissive long-pass filter for permitting light mainly in the infrared-light region to pass therethrough.

The video signal processing apparatus may further include a demosaic processor for demosaicing a mosaic image output from the image sensor, wherein the infrared-light component remover receives demosaic data generated by the demosaic processor and generates for each pixel a color signal containing a visible-light component with the infrared-light component removed therefrom.

The video signal processing apparatus may further include an interpolator for generating an image containing a visible-light component and an infrared-light component by interpolating a mosaic image generated from transmission data of the visible-light transmissive long-pass filter contained in the color filter.

The video signal processing apparatus may further include a decoder for generating infrared-light communication data by decoding a mosaic image generated from transmission data of the infrared-light transmissive long-pass filter contained in the color filter.

In accordance with one embodiment of the present invention, an image sensor receives light through a color filter. The color filter includes long-pass filters only or a combination of a long-pass filter and an all-transmissive filter. The long-pass filters includes a visible-light transmissive long-pass filter for permitting a visible-light component and an infrared-light component to pass therethrough and an infrared-light transmissive long-pass filter for permitting an infrared-light component to pass selectively therethrough.

Each of the visible-light transmissive long-pass filter and the infrared-light transmissive long-pass filter, forming the color filter, may have a substantially constant transmittance in the infrared-light region.

The color filter may include a long-pass filter for permitting light in a visible-light region and an infrared-light region to pass therethrough with only an ultraviolet-light component cut off, a long-pass filter for permitting light in the visible-light region equal to or longer than a yellow light wavelength and the infrared-light region to pass therethrough, a long-pass filter for permitting light in the visible-light region equal to or longer than a red light wavelength and in the infrared-light region to pass therethrough and an infrared-light transmissive long-pass filter for permitting light mainly in the infrared-light region to pass therethrough.

The color filter may include an all-transmissive filter for permitting light in a visible-light region and an infrared-light region to pass therethrough, a long-pass filter for permitting light in the visible-light region equal to or longer than a yellow light wavelength and the infrared-light region to pass therethrough, a long-pass filter for permitting light in the visible-light region equal to or longer than a red light wavelength and the infrared-light region to pass therethrough and an infrared-light transmissive long-pass filter for permitting light mainly in the infrared-light region to pass therethrough.

In accordance with one embodiment of the present invention, a video signal processing method of a video signal processing apparatus, include steps of receiving, on an image sensor, light through a color filter, the color filter including long-pass filters only or a combination of a long-pass filter and an all-transmissive filter, the long-pass filter in the color filter including a visible-light transmissive long-pass filter for permitting a visible-light component and an infrared-light component to pass therethrough and an infrared-light transmissive long-pass filter for permitting an infrared-light component to pass selectively therethrough and removing an infrared-light component contained in a signal having passed through the visible-light transmissive long-pass filter, with transmittance data of an infrared-light region of the visible-light transmissive long-pass filter and the infrared-light transmissive long-pass filter applied.

The step of removing the infrared-light component may include calculating a parameter that reduces to approximately zero the infrared-light component contained in the signal having passed through the visible-light transmissive long-pass filter, with the transmittance data of the infrared-light region of the visible-light transmissive long-pass filter and the infrared-light transmissive long-pass filter applied, and generating, with the calculated parameter applied, a color signal being a visible-light component that is obtained by removing the infrared-light component from the signal having passed through the visible-light transmissive long-pass filter.

In accordance with one embodiment of the present invention, a computer program for causing a video signal processing apparatus to perform a video signal processing method, include steps of receiving, on an image sensor, light through a color filter, the color filter including long-pass filter only or a combination of a long-pass filter and an all-transmissive filter, the long-pass filters in the color filter including a visible-light transmissive long-pass filter for permitting a visible-light component and an infrared-light component to pass therethrough and an infrared-light transmissive long-pass filter for permitting an infrared-light component to pass selectively therethrough and removing an infrared-light component contained in a signal having passed through the visible-light transmissive long-pass filter, with transmittance data of an infrared-light region of the visible-light transmissive long-pass filter and the infrared-light transmissive long-pass filter applied.

The computer program may be supplied in one of a recording medium and a communication medium. Each of the recording medium and the communication medium can provide the computer program in a computer readable fashion to a general-purpose computer system executing a variety of program codes. With the computer program supplied in a computer readable fashion, the computer system executes processes responsive to the computer program.

These and other objects and advantages will become apparent from the following description of the embodiments of the invention and the accompanying drawings. The word system refers to a set of a plurality of apparatuses and elements in each apparatus are not necessarily housed in the same casing.

In the video signal processing apparatus in accordance with one embodiment of the present invention, the image sensor receives light through the color filter, the color filter including the long-pass filters only or the combination of the long-pass filter and the all-transmissive filter. The long-pass filters include the visible-light transmissive long-pass filter for permitting the visible-light component such as RGB signals and the infrared-light component to pass therethrough and the infrared-light transmissive long-pass filter for permitting the infrared-light component to pass selectively therethrough. The video signal processing apparatus removes the infrared-light component contained in the signal having passed through the visible-light transmissive long-pass filter, with transmittance data of the infrared-light region of the visible-light transmissive long-pass filter and the infrared-light transmissive long-pass filter applied. The video signal processing apparatus thus obtains the RGB video signal. The long-pass filter has generally flat transmittance in the infrared light region. The video signal processing apparatus calculates the parameter that reduces to approximately zero the infrared-light component contained in the signal having passed through the visible-light transmissive long-pass filter, with the transmittance data of the infrared-light region of the visible-light transmissive long-pass filter and the infrared-light transmissive long-pass filter applied. The video signal processing apparatus generates, with the calculated parameter applied, the color signal containing the visible-light component with the infrared-light component removed therefrom contained in the signal having passed through the visible-light transmissive long-pass filter. The infrared-light component is thus precisely removed and a high-quality RGB image results.

BRIEF DESCRIPTION OF THE DRAWINGS

FIGS. 1A and 1B illustrate a color filter array of a typical color filter;

FIG. 2 illustrates a color filter array containing an infrared-light transmissive long-pass filter;

FIG. 6 illustrates a color filter array of a color filter of one embodiment of the present invention;

FIG. 10 illustrates a color filter array of a color filter of one embodiment of the present invention; and FIG. 11 illustrates a color filter array of a color filter of one embodiment of the present invention.

DESCRIPTION OF THE PREFERRED EMBODIMENTS

An information processing apparatus, an image sensor, an image processing method and a computer program in accordance with embodiments of the present invention are described below with reference to the drawings.

In accordance with one embodiment of the present invention, the information processing apparatus includes an imaging device such as a still camera or a video camera. The information processing apparatus acquires an infrared-light image and a visible-light image and generates a color image having an excellent color reproduction property. The information processing apparatus of one embodiment of the present invention receives, on the image sensor, light through a color filter including a combination of a plurality of long-pass filters permitting light of a wavelength longer than a particular cutoff wavelength. The information processing apparatus then generates high-quality visible image and infrared-light image by processing the received signal. More specifically, the information processing apparatus generates the infrared-light image and the visible-light image by processing a video signal using the color filter composed of the long-pass filters.

Figure 2:
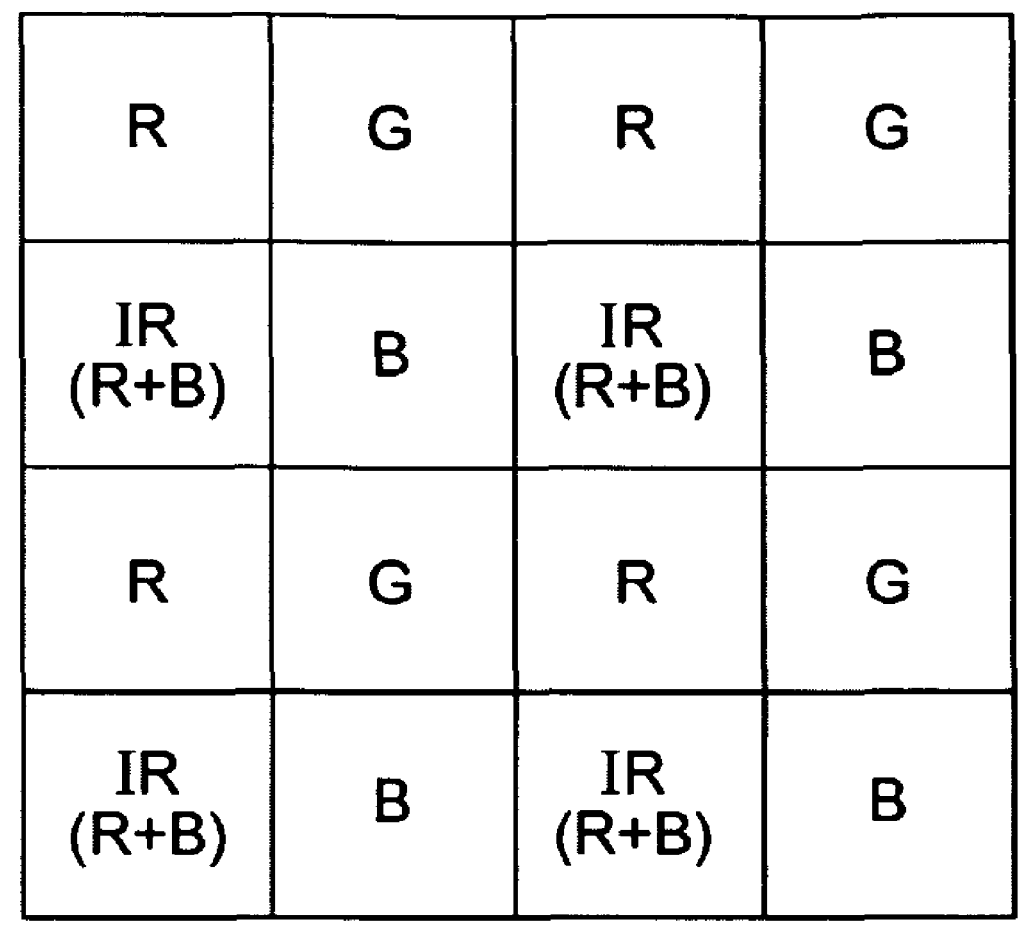

With reference to FIG. 2 and other figures, signal processing of a captured signal using a widely available color filter is described before describing the embodiments of the present invention. The process example disclosed in U.S. Pat. No. 6,211,521 is discussed herein. FIG. 2 illustrates a color filter including a filter (RGB) permitting light having each of red (R), green (G) and blue (B) light wavelengths to pass therethrough and a filter (IR) permitting infrared light to pass therethrough. The filter (IR) is a combination of a R filter and a B filter. An amount of infrared light having passed through each of the filters (R,G,B) is estimated by calculating an amount of infrared light received through the infrared-light transmissive filter (IR). The infrared-light component is removed based on the estimated amount of infrared light.

Figure 3:
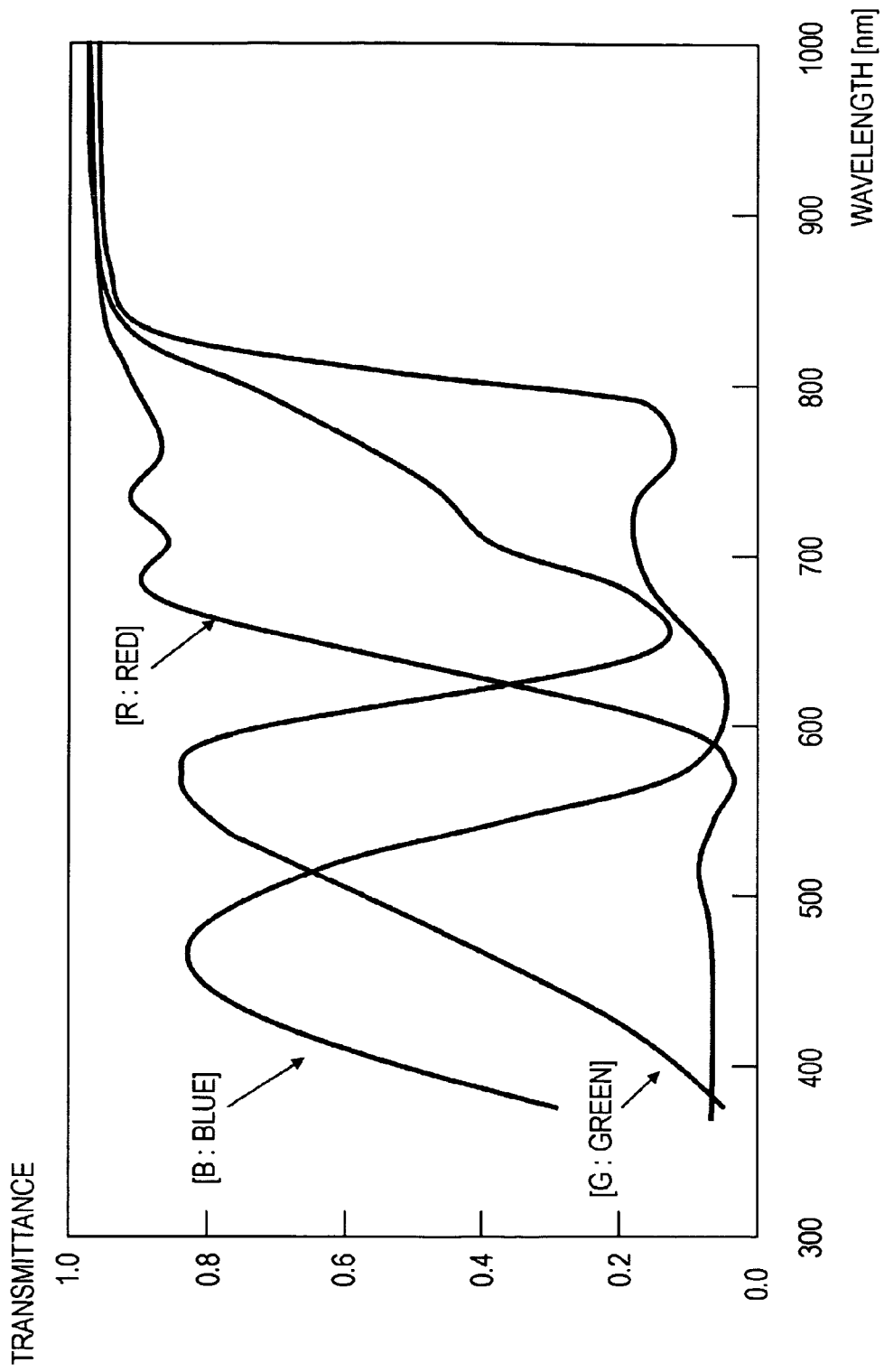
FIG. 3 illustrates spectroscopic characteristics of red, green, blue light filters.

Spectroscopic characteristics of the filters (R,G,B) in the color filter of FIG. 2 are shown in FIG. 3. Blue [B:BLUE] and green [G:GREEN] filters have respectively bandpass filter characteristics that permit light having predetermined bands in the blue and green light wavelengths to pass therethrough and further permit partly light in an infrared light region (i.e., equal to or higher than about 780 nm). Within a band of from about 700 nm to about 800 nm, the [B:BLUE] filter and the [G:GREEN] filter are substantially different in transmission characteristics.

Red [R:RED] represents characteristics of a long-pass filter having a cutoff frequency at about 600 nm with a ripple appearing within the cutoff region thereof. The red [R:RED] filter permits light having a wavelength of about 600 nm or longer. The blue [B:BLUE] filter and the green [G:GREEN] filter are bandpass filters and the [R:RED] filter is a long-pass filter. As shown in FIG. 2, the infrared-light transmissive filter (IR) is added.

Figure 4:
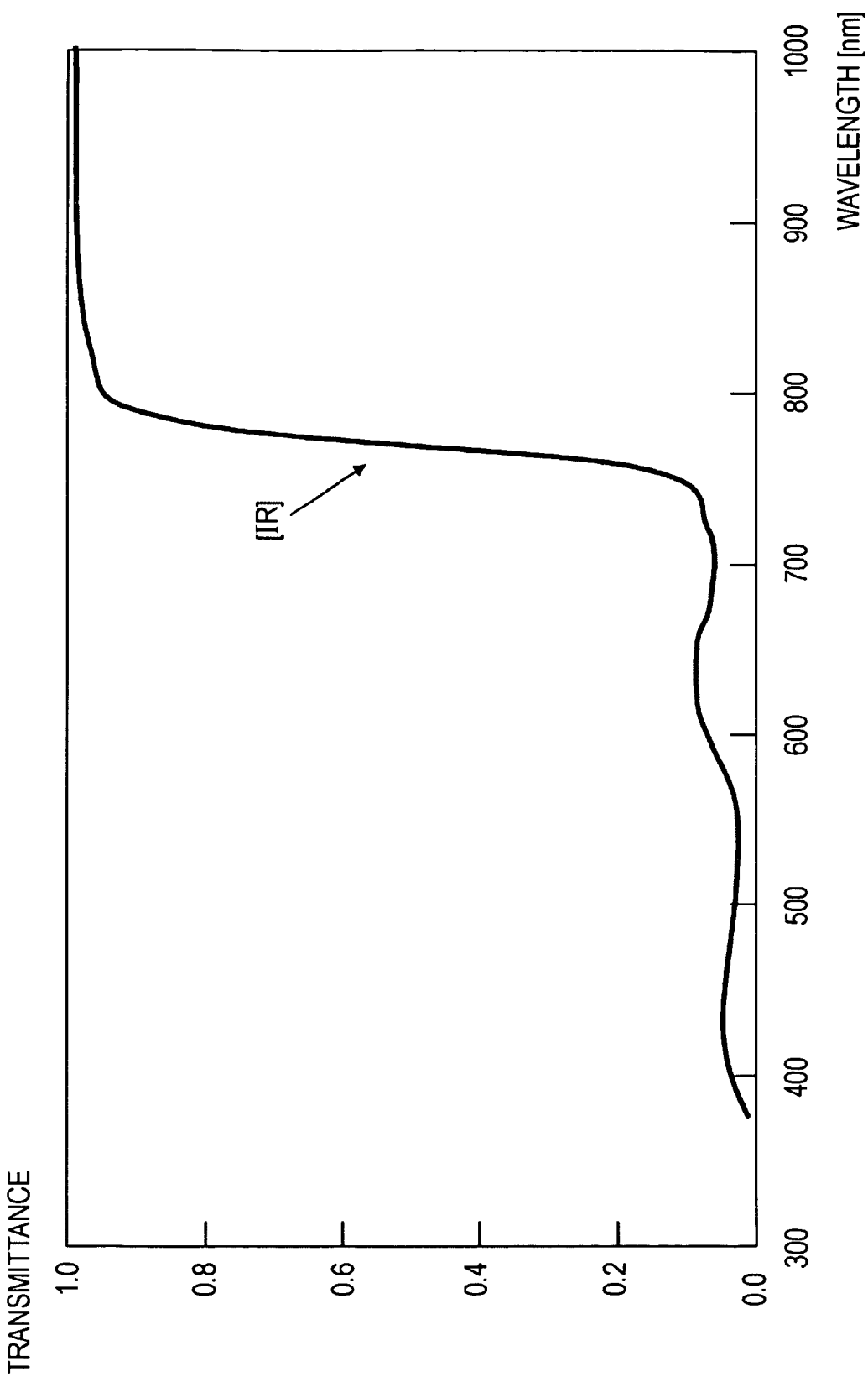
FIG. 4 illustrates spectroscopic characteristics of an infrared-light (IR) transmissive filter.

FIG. 4 illustrates spectroscopic characteristics of the infrared-light transmissive filter (IR). The infrared-light transmissive filter (IR) includes a combination of the red [R:RED] filter and the blue [B:BLUE] filter and is considered as a long-pass filter having a cutoff frequency at about 780 nm with a ripple appearing on about 600 nm.

Figure 5:
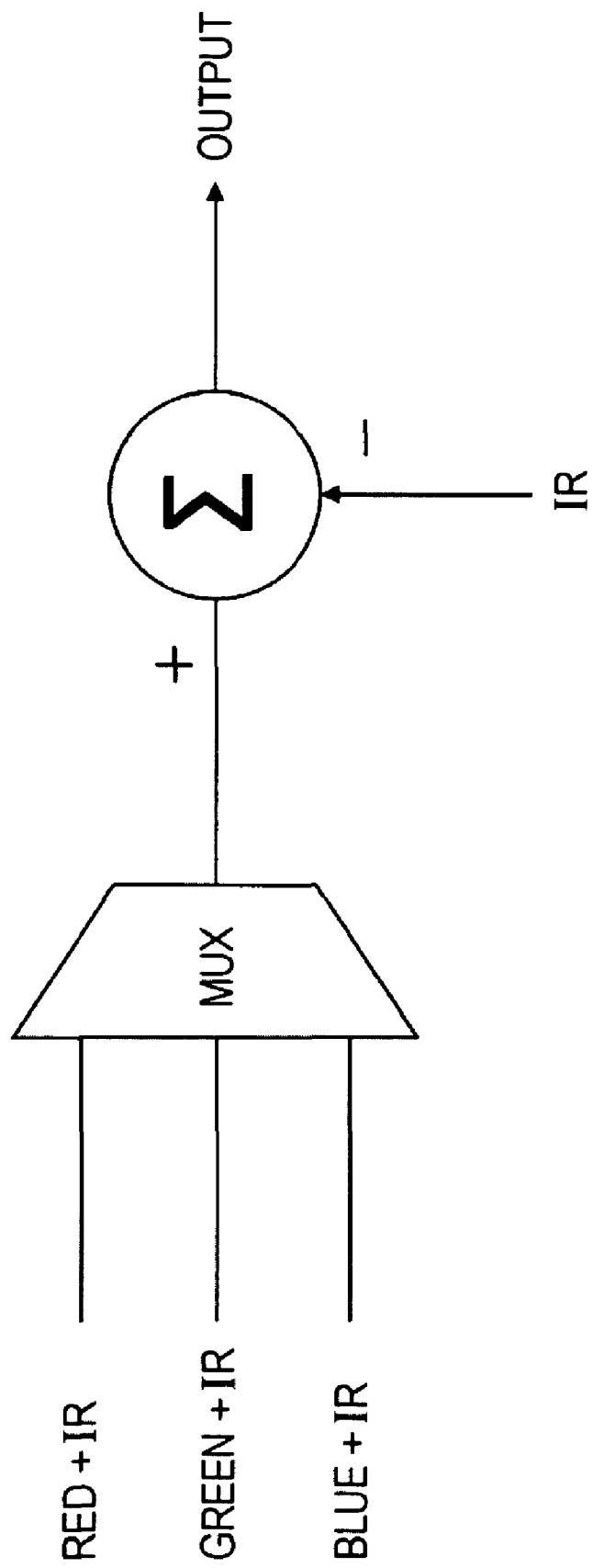
FIG. 5 illustrates an signal processing circuit that acquires an output signal composed of only an infrared-light component by calculating an amount of infrared light having passed through the infrared-light transmissive filter.

An output image made of only a visible-light component is obtained from light having passed through filters (R, G, B, IR) having four different filter characteristics. To obtain the output image, signal processing is performed to remove the infrared-light component from the light having passed through the RGB filters. More specifically, an amount of infrared light having passed through the infrared-light transmissive filter (IR) is calculated. The calculated amount of infrared light is estimated as an amount of infrared light having passed through the filters (R,G,B). The infrared-light component is removed based on the estimated amount of infrared light. As shown in FIG. 5, light beams having passed through the filters (R,G,B) are considered as having the same amount of infrared light, namely, R+IR, G+IR and G+IR. The signal processing is performed by subtracting the amount of infrared light having passed through the infrared-light transmissive filter (IR) from the visible light beams. The visible-light component thus results.

The signal processing calculation process is performed in accordance with the following equation (1):

$$\begin{bmatrix} r_{820-1000} \\ g_{820-1000} \\ b_{820-1000} \end{bmatrix} = \begin{bmatrix} R_{820-1000} \\ G_{820-1000} \\ B_{820-1000} \end{bmatrix} - IR_{820-1000} \begin{bmatrix} k_r \\ k_g \\ k_b \end{bmatrix} = \vec{0} \quad (1)$$

$$\begin{bmatrix} IR_{820-1000} \\ R_{820-1000} \\ G_{820-1000} \\ B_{820-1000} \end{bmatrix} = \begin{bmatrix} 0.95 \\ 0.95 \\ 0.95 \\ 0.95 \end{bmatrix} \quad (2)$$

$$\begin{bmatrix} k_r \\ k_g \\ k_b \end{bmatrix} = \begin{bmatrix} 1 \\ 1 \\ 1 \end{bmatrix} \quad (3)$$

With equation (1), an infrared-light component having a longer wavelength (about 820 nm to 1000 nm) is removed from the infrared-light component contained in the light beam having passed through the filters (R,G,B).

In equation (1), $R_{820-1000}$ represents an infrared-light component (about 820 nm to 1000 nm) of the light having passed through the red [R:RED] filter, $G_{820-1000}$ represents an infrared-light component (about 820 nm to 1000 nm) of the light having passed through the green [G:GREEN] filter, $B_{820-1000}$ represents an infrared-light component (about 820 nm to 1000 nm) of the light having passed through the blue [B:BLUE] filter and $IR_{820-1000}$ represents an infrared-light component (about 820 nm to 1000 nm) of the light having passed through the infrared light [IR] filter.

Products obtained from multiplying the coefficient kr, kg and kb by the component obtained through the infrared-light transmissive filter are subtracted from the light beams having passed through the filters (R,G,B). Remaining components without the infrared-light component (about 820 nm to 1000 nm) are thus $r_{820-1000}$, $g_{820-1000}$ and $b_{820-1000}$. Coefficients kr, kg and kb for reducing the remaining components to about zero are calculated.

Transmittances of the infrared-light components (about 820 nm to 1000 nm) of the visible-light filters (R,G,B) and the infrared light filter (IR) are all 0.95, as represented by equation (2):

$IR_{820-1000}$=0.95,
$R_{820-1000}$=0.95,
$G_{820-1000}$=0.95, and
$B_{820-1000}$=0.95

Conditions of the coefficients satisfying equations (1) are represented by equations (3):

kr=1,
kg=1, and
kb=1

The above calculation process is performed as a removal process of a long wavelength portion of the infrared-light component (falling within a range of about 820 to 1000 nm). Near-infrared light affecting color reproduction of an image contains light from deep red to near-infrared light within a range of about 680 nm to 820 nm. In particular, an object such as clothes is dyed with a dye having a high reflectance in the near-infrared light. To improve color reproduction property, an infrared light cut filter having a cutoff frequency of about 665 nm is used to cut off relatively short wavelength light ranging from the deep red to near-infrared region.

In addition to the range of about 820 nm to 1000 nm, infrared light having passed through each of the filters (R,G,B) is removed in an infrared-light component having a relatively short wavelength (in the vicinity of about 750 nm). To this end, coefficients jr, jg and jb satisfy the following equation (4):

$$\begin{bmatrix} r_{820-1000} \\ g_{820-1000} \\ b_{820-1000} \\ r_{750} \\ g_{750} \\ b_{750} \end{bmatrix} = \begin{bmatrix} R_{820-1000} \\ G_{820-1000} \\ B_{820-1000} \\ R_{750} \\ G_{750} \\ B_{750} \end{bmatrix} - \begin{bmatrix} IR_{820-1000} j_r \\ IR_{820-1000} j_g \\ IR_{820-1000} j_b \\ IR_{750} j_r \\ IR_{750} j_g \\ IR_{750} j_b \end{bmatrix} = \vec{0} \quad (4)$$

$$\begin{bmatrix} IR_{820-1000} \\ R_{820-1000} \\ G_{820-1000} \\ B_{820-1000} \\ IR_{750} \\ R_{750} \\ G_{750} \\ B_{750} \end{bmatrix} = \begin{bmatrix} 0.95 \\ 0.95 \\ 0.95 \\ 0.95 \\ 0.95 \\ 0.95 \\ 0.32 \\ 0.15 \end{bmatrix} \quad (5)$$

With equation (4), the long wavelength portion (within a range of about 820 nm to 1000 nm) of the infrared-light component contained in the light having passed through the filters (R,G,B) is thus removed.

In equation (4), $R_{820-1000}$ represents an infrared-light component (about 820 nm to 1000 nm) of the light having passed through the red [R:RED] filter, $G_{820-1000}$ represents an infrared-light component (about 820 nm to 1000 nm) of the light having passed through the Green [G:GREEN] filter, $B_{820-1000}$ represents an infrared-light component (about 820 nm to 1000 nm) of the light having passed through the Blue [B:BLUE] filter. $R_{750}$ represents an infrared-light component (about 750 nm) of the light having passed through the red [R:RED] filter, $G_{750}$ represents an infrared-light component (about 750 nm) of the light having passed through the green [G:GREEN] filter, and $B_{750}$ represents an infrared-light component (about 750 nm) of the light having passed through the blue [B:BLUE] filter. $IR_{820-100}$ represents an infrared-light component (about 820 nm to 1000 nm) of the light having passed through the infrared light [IR] filter and $IR_{750}$ represents an infrared-light component (about 750 nm) of the light having passed through the infrared light [IR] filter.

Products obtained from multiplying the coefficient kr, kg and kb by the component obtained through the infrared-light transmissive filter (IR) are subtracted from the light beams having passed through the filters (R,G,B). Remaining components without the infrared-light component (about 820 nm to 1000 nm) and the infrared-light component (about 750 nm) are thus $r_{820-1000}$, $g_{820-1000}$, $b_{820-1000}$, $r_{750}$, $g_{750}$ and $b_{750}$. Coefficients kr, kg and kb for reducing the remaining components to about zero are calculated.

Transmittances of the infrared-light components (about 820 nm to 1000 nm) of the visible-light filters (R,G,B) and the infrared light filter (IR) are represented by equations (5):

$IR_{820-1000}=0.95$,
$R_{820-1000}=0.95$,
$G_{820-1000}=0.95$,
$B_{820-1000}=0.95$,
$IR_{750}=0.95$,
$R_{750}=0.95$,
$G_{750}=0.32$, and
$B_{750}=0.15$ In equation (4), a first row and a fourth row, namely,
$(r_{820-1000}=(R_{820-1000})-((IR_{820-1000})jr)$ and
$(r_{750})=(R_{750})-((IR_{750})jr)$
are linearly dependent, but the remaining equations are linearly independent. There are five linearly dependent equations with three unknown numbers. Coefficients jr, jg and jb satisfying equation (4) cannot be solved.

This means that any combination of coefficients selected in the subtraction cannot remove the infrared light in the band of from about 820 nm to 1000 nm in each of the RGB channels and the infrared light at about 750 nm.

The infrared-light components to be removed are not limited to those components. In a graph of FIG. 3 illustrating transmittances of the filters (R,G,B), transmittances are different from wavelength to wavelength within a band of from 680 nm to 820 nm. Removing the infrared light of a wavelength other than those described above is translated into an increase in the number of linearly independent equations with the number of unknowns unchanged. The infrared-light component passing through the filters (R,G,B) cannot be precisely calculated based on only information regarding light having passed through the infrared filter (IR).

As previously discussed with reference to FIG. 4, the infrared filter (IR) is a long-pass filter that permits light having a wavelength equal to or longer than about 780 nm, and transmittance characteristics of infrared light within the passband is not dependent on wavelength and remains substantially constant (at about 0.95). As previously discussed with reference to FIG. 3, the blue [B:BLUE] filter and green [G:GREEN] filter are bandpass filters, each permitting light in respective bands for blue and green. Not only the blue and green light filters but also cyan and magenta light filters are typically bandpass filters permitting selectively one or a plurality of color light beams to pass therethrough. These bandpass filters are different in infrared light transmission characteristics.

It is difficult to remove precisely only the infrared-light component from the light having passed through the bandpass filters different in characteristics based on the signal acquired by single infrared light transmissive pixels. An accurate infrared-light component cannot be removed from the data acquired from the combination of the bandpass filters and the infrared light filter (IR).

The present invention solves the above problem. A bandpass filter permitting light in a predetermined band only is not used as a color filter. A color filter including long-pass filters only or a combination of a long-pass filter and an all-transmissive filter is used to form a color filter array of the image sensor.

The signal process performed by the imaging device having the color filter array precisely removes the infrared-light component from the light having passed through each long-pass filter, thereby resulting in a color image having excellent color reproduction property.

A long-pass filter cuts off light having a wavelength shorter than a predetermined cutoff wavelength and permits light having a wavelength longer than the predetermined cutoff wavelength. The transmission characteristics of the infrared light remain substantially content with wavelength regardless of filter type. Through linear calculation of obtained signal, the infrared-light component can be easily removed. Bandpass characteristics permitting only red light to pass therethrough are synthesized by subtracting a signal obtained from a pixel having passed through a filter passing infrared light only from a signal obtained from a pixel having passed through both a red light filter and an infrared light filter.

FIG. 6 illustrates a color filter array of one embodiment of the present invention. The color filter array of FIG. 6 has the following structure:

ultraviolet cut filter (ALL): long-pass filter cutting only ultraviolet with a cutoff wavelength of about 380 nm (having a wavelength shorter than about 380 nm) and permitting light having a wavelength of about 380 nm or longer;

yellow light filter (Ye+IR): long-pass filter permitting light having a wavelength of about 500 nm or longer with a cutoff wavelength of about 500 nm;

red light filter (R+IR): long-pass filter permitting light having a wavelength of about 580 nm or longer with a cutoff wavelength of about 580 nm; and infrared light transmissive filter (IR): long-pass filter permitting light having a wavelength of about 660 nm or longer with a cutoff wavelength of about 660 nm.

The color filter array of FIG. 6 includes long-pass filters of four different types. The ultraviolet cut filter (ALL), the yellow light filter (Ye+IR) and the red light filter (R+IR) are visible-light transmissive long-pass filters, permitting a visible-light component and an infrared-light component to pass therethrough. The infrared light transmissive filter (IR) is a long-pass filter permitting selectively an infrared-light component to pass therethrough. In accordance with one embodiment of the present invention, the color filter used includes long-pass filters only or only a combination of long-pass filters and an all-transmissive filter.

The color filter array of FIG. 6 includes sixteen pixels. More specifically, the color filter array of FIG. 6 includes eight pixels for the ultraviolet cut filter (ALL) arranged in a checkered pattern, four pixels for the yellow light filter (Ye+IR) arranged every two rows and every two columns, two pixels for the red light filter (R+IR) and two pixels for the infrared light transmissive filter (IR).

Figure 7:
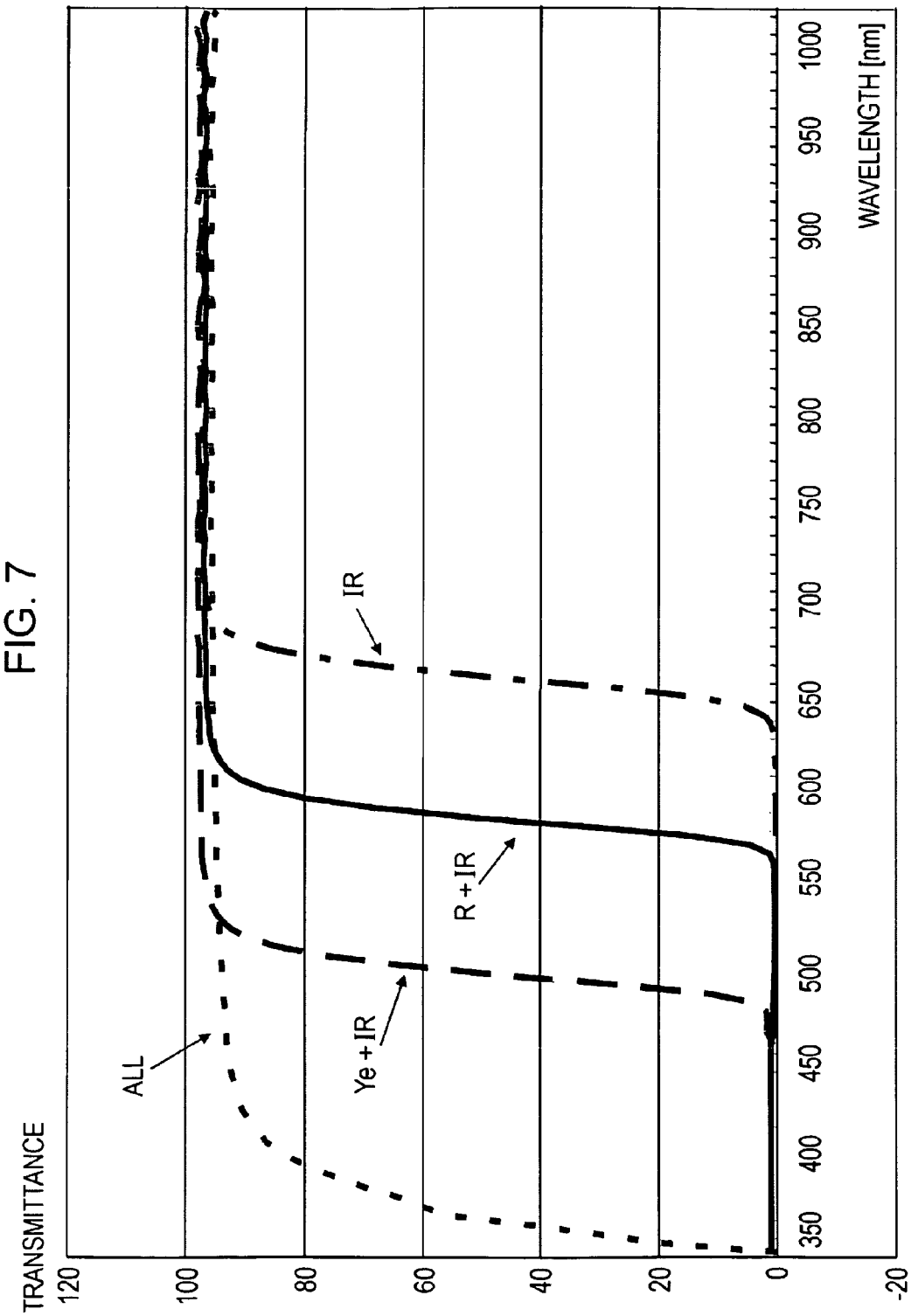
FIG. 7 illustrates gain characteristics of four types of long-pass filters included in a color filter array of FIG. 6.

FIG. 7 illustrates gain characteristics of the long-pass filters of four types contained in the color filter array of FIG. 6. In a graph of FIG. 7, the ordinate represents transmittance (%)

and the abscissa represents wavelength (nm). Each of the ultraviolet cut filter (ALL), the yellow light filter (Ye+IR) and the red light filter (R+IR) is a long-pass filter permitting light having a wavelength above the cutoff wavelength thereof, and all of the filters permit infrared light to pass therethrough.

The cutoff wavelength of the ultraviolet cut filter (ALL) is about 380 nm and the transmittance thereof substantially changes between about 350 nm and about 400 nm. The ultraviolet cut filter (ALL) cuts off generally light having a wavelength shorter than about 350 nm and permits generally light having a wavelength longer than about 400 nm to pass therethrough. The infrared light transmittance $L_{680-1000}$ is a generally constant value of about 0.95.

Similarly, the yellow light filter (Ye+IR) has a cutoff wavelength of about 500 nm and the transmittance thereof substantially changes between about 480 nm and about 520 nm. The yellow light filter (Ye+IR) cuts off generally light having a wavelength shorter than about 480 nm and permits generally light having a wavelength longer than about 520 nm to pass therethrough. The infrared light transmittance $Y_{680-1000}$ is a generally constant value of about 0.98.

The red light filter (R+IR) has a cutoff wavelength of about 580 nm and the transmittance thereof substantially changes between about 560 nm and about 600 nm. The red light filter (R+IR) cuts off generally light having a wavelength shorter than about 560 nm and permits generally light having a wavelength longer than about 600 nm to pass therethrough. The infrared light transmittance $R_{680-1000}$ is a generally constant value of about 0.96.

The infrared light transmissive filter (IR) has a cutoff wavelength of about 660 nm. The infrared light transmissive filter (IR) cuts off generally light having a wavelength shorter than about 640 nm and permits generally light having a wavelength longer than about 680 nm to pass therethrough. The infrared light transmittance $IR_{680-1000}$ is a generally constant value of about 0.97.

The gain characteristics of the long-pass filters of four types shown in FIG. 7 show that the transmittance of each filter generally falls within a range of about 0.95 to 0.98 and does not change greatly in within all infrared light range, namely, a wavelength range longer than about 680 nm.

In accordance with one embodiment of the present invention, the signals are obtained from the four types of spectroscopic filters based on the characteristics of the long-pass filters and the removal process to remove the infrared light ranging from about 680 nm to about 1000 nm is performed in accordance with the obtained signals. Precise tri-color signals are thus obtained.

The long-pass filters of the four types shown in FIG. 6 include the ultraviolet cut filter (ALL), the yellow light filter (Ye+IR), the red light filter (R+IR) and the infrared light transmissive filter (IR).

Parameters (coefficients) mr, mg and mb to remove the infrared light of the infrared-light component (about 680 nm to about 1000 nm) are determined from the four signals through these filters in accordance with equation (6):

$$\begin{bmatrix} r_{680-1000} \\ g_{680-1000} \\ b_{680-1000} \end{bmatrix} = \begin{bmatrix} R_{680-1000} \\ Y_{680-1000} \\ L_{680-1000} \end{bmatrix} - \begin{bmatrix} IR_{680-1000}m_r \\ IR_{680-1000}m_g \\ IR_{680-1000}m_b \end{bmatrix} = \vec{0} \qquad (6)$$

$$\begin{bmatrix} IR_{680-1000} \\ R_{680-1000} \\ Y_{680-1000} \\ L_{680-1000} \end{bmatrix} = \begin{bmatrix} 0.97 \\ 0.96 \\ 0.98 \\ 0.95 \end{bmatrix} \qquad (7)$$

$$\begin{bmatrix} m_r \\ m_g \\ m_b \end{bmatrix} = \begin{bmatrix} 0.96/0.97 \\ 0.98/0.96 \\ 0.95/0.98 \end{bmatrix} \qquad (8)$$

$$\begin{bmatrix} r \\ g \\ b \end{bmatrix} = \begin{bmatrix} R \\ Y \\ L \end{bmatrix} - \begin{bmatrix} IR \cdot m_r \\ R \cdot m_g \\ Y \cdot m_b \end{bmatrix} \qquad (9)$$

In equation (6), $R_{680-1000}$ represents an infrared-light component (about 680 nm to 1000 nm) in the light having passed through the red light long-pass filter (R+IR), $Y_{680-1000}$ represents an infrared-light component (about 680 nm to 1000 nm) in the light having passed through the yellow light long-pass filter (Ye+IR), $L_{680-1000}$ represents an infrared-light component (about 680 nm to 1000 nm) in the light having passed through the all transmissive long-pass filter (ALL), and $IR_{680-1000}$ represents an infrared-light component (about 680 nm to 1000 nm) in the light having passed through the infrared light transmissive long-pass filter (IR).

Products obtained from multiplying the coefficients mr, mg and mb by the component obtained through the long-pass filter are subtracted from the light beams having passed through the long-pass filters (R+IR, Ye+IR, ALL). Remaining components without the infrared-light component (about 680 nm to 1000 nm) are thus $r_{680-1000}$, $g_{680-1000}$ and $b_{680-1000}$. Coefficients mr, mg and mb for reducing the remaining components to about zero are calculated.

Transmittances of the infrared-light components (about 680 nm to 1000 nm) of the long-pass filters (R+IR, Ye+IR, ALL), each permitting a visible-light component and the infrared light filter (IR) are shown in equation (7) as previously discussed with reference to FIG. 7:

$IR_{680-1000}=0.97$,
$R_{680-1000}=0.96$,
$G_{680-1000}=0.98$, and
$B_{680-1000}=0.95$ Conditions of the coefficients mr, mg and mb satisfying equations (6) are represented by equations (8):

mr=0.96/0.97
mg=0.98/0.96, and
mb=0.95/0.98

The parameter values of equation (8) are substituted in equation (9), and spectroscopic transmittances of r, g and b are determined through image processing.

Red (r) is determined by subtracting from the output from the red light long-pass filter (R+IR) a product resulting from multiplying the output from the infrared light transmissive filter (IR) by the parameter mr. Green (g) is determined by subtracting from the output from the yellow light long-pass filter (Ye+IR) a product resulting from multiplying the output from the infrared light transmissive filter (IR) by the parameter mg. Blue (b) is determined by subtracting from the output from the all-transmissive long-pass filter (ALL) a product resulting from multiplying the output from the infrared light transmissive filter (IR) by the parameter mb. Specifically, Red (r)=(R+IR)−(IR×mr)
Green (g)=(Ye+IR)−(IR×mg)
Blue (b)=(ALL)−(IR×mb)

The parameters (coefficients) are:
mr=0.96/0.97,
mg=0.98/0.96, and
mb=0.95/0.98

Figure 8:
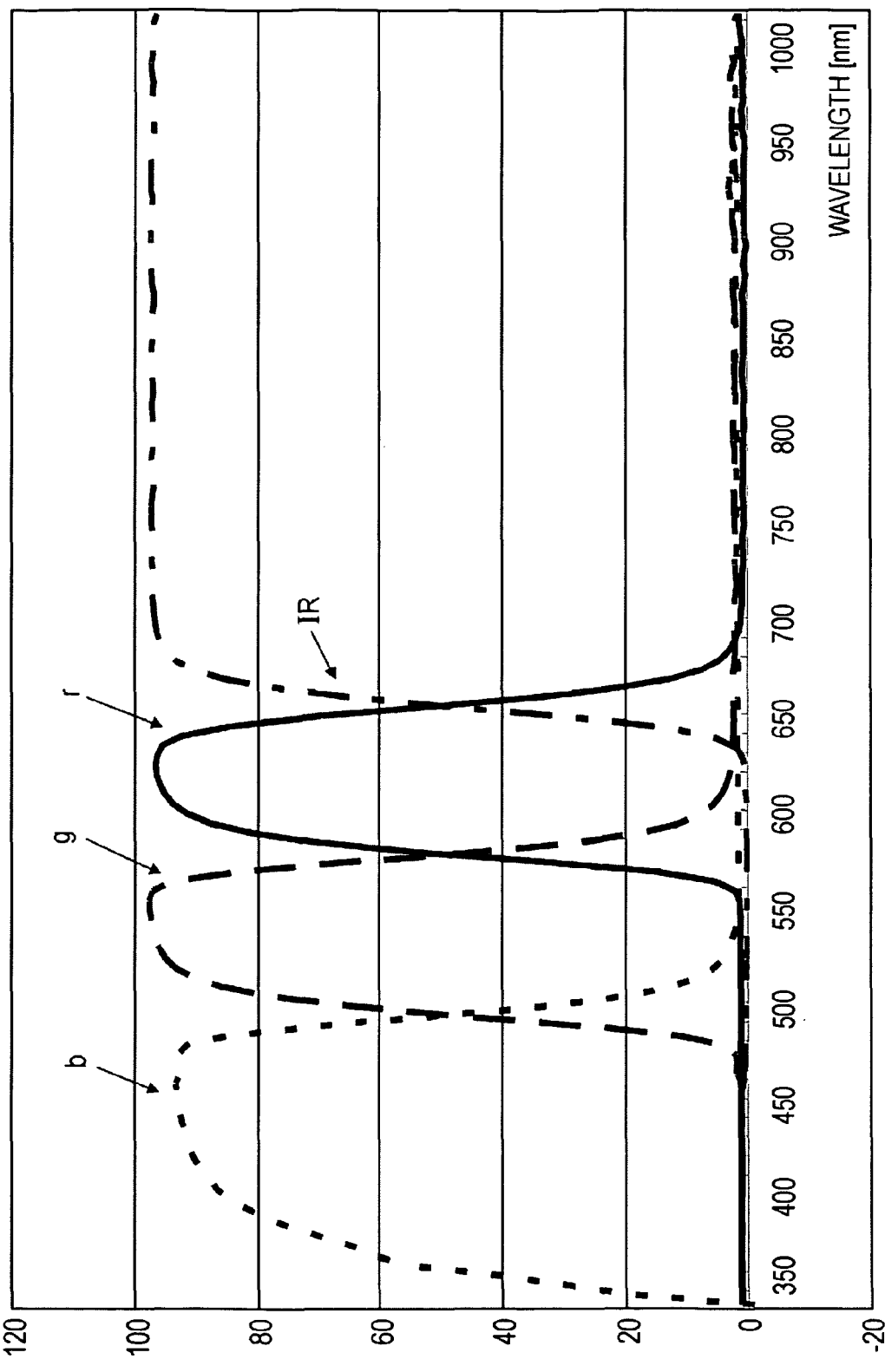
FIG. 8 illustrates transmittances of red, green and blue light beams calculated with resulting parameters (coefficients) mr, mg and mb applied.

FIG. 8 illustrates transmittances of r, g and b by calculating equation (9) with the thus calculated parameters mr, mg and mb applied. As shown in FIG. 8, r, g and b represent light components in particular wavelength bands corresponding to the red (r), green (g) and blue (b). Light components having no redundant wavelength component can thus be extracted.

Figure 9:
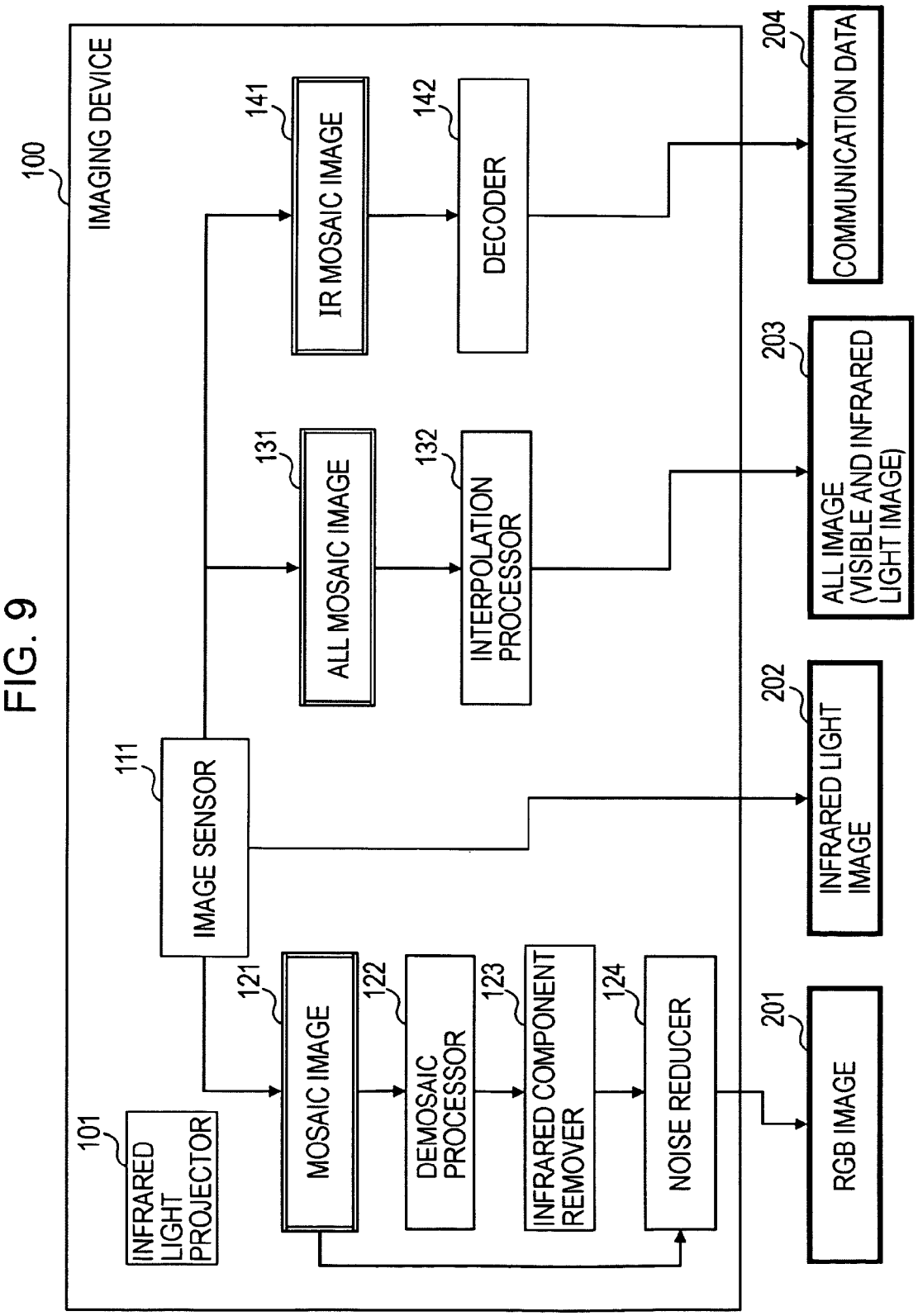
FIG. 9 illustrates a structure and process of an imaging device in accordance with one embodiment of the present invention.

An imaging device 100 of FIG. 9 performs an image capturing process with the color filter composed of the above-referenced long-pass filters applied and a signal removal process for removing the infrared-light component.

The imaging device 100 includes an image sensor 111 and the long-pass filters of four types discussed with reference to FIGS. 6 and 7, i.e., the ultraviolet cut filter (ALL), the yellow light filter (Ye+IR), the red light filter (R+IR) and the infrared light transmissive filter (IR).

The image captured by the image sensor 111 is input as a mosaic image 121 corresponding to the color filter array described with reference to FIG. 6. In the mosaic image 121, each pixel is assigned one of the four types of signals (ALL, Ye+IR, R+IR and IR). A demosaic processor 122 performs a mosaic process, namely, assigns one of the signals (ALL, Ye+IR, R+IR and IR) to each pixel. For example, an interpolation process is performed to regulate all pixels on a per color basis using a high-definition signal of the ALL pixels.

An infrared component remover 123 calculates infrared light removal parameters mr, mg and mb in accordance with previously discussed equations (6)-(9). The infrared component remover 123 performs an infrared light component removal process by extracting the r, g and b signal components in accordance with equation (9) with the calculated parameters mr, mg and mb.

The infrared component remover 123 removes the infrared-light component contained in the signal obtained via the visible-light transmissive long-pass filter by applying transmittance data of the infrared light region of the visible-light transmissive long-pass filter and the infrared light transmissive long-pass filter. More specifically, as described with reference to equations (6)-(9), the infrared component remover 123 calculates the parameters (mr, mg, and mb) that reduce to approximately zero the infrared-light component contained in the signal obtained via the visible-light transmissive long-pass filter, using the transmittance data of the infrared light region of the visible-light transmissive long-pass filter and the infrared light transmissive long-pass filter. With the calculated parameters applied, the infrared component remover 123 then generates a color signal composed of a visible-light component free from the infrared-light component contained in the signal obtained via the visible-light transmissive long-pass filter.

A noise reducer 124 performs a noise reduction process. For example, the noise reducer 124 performs the noise reduction process such as an edge preserving process based on an ALL image. An RGB image 201 thus results. The noise reduction process performed by the noise reducer 124 may be the one disclosed in the paper entitled "Digital Photography with Flash and No-Flash Image Pairs" ACM, SIGGRAPH 2004, Volume 23 Issue 3 pp. 664-672, George Petchnigg, Maneesh Agarawala, Hughes Hoppe, Richard Szeliski, Michel Cohen and Kentaro Toyama. More specifically, a joint bilateral filter defined in the paper may be used in the noise reduction process.

As disclosed in the paper, no-flash image having appropriate color but at a high noise level is a first input and a flash image different in color from color desired by a user but at a low noise level is a second input. The joint bilateral filter thus results in noise reduction results ANR in the noise reduction process. If the joint bilateral filter is used in one embodiment of the present invention, a high-noise RGB image obtained as a result of the infrared-light component removal is used as a first input and a low-noise ALL image, which contains an infrared-light component and is at low noise level because of the high signal level, is used as a second input. A noise reduced image thus results.

The RGB image 201 is a high-quality RGB signal containing more the signal components of red (r), green (g) and blue (b) with the infrared-light component removed therefrom as described with reference to FIG. 8.

The filters for the image sensor 111 are the long-pass filters permitting the infrared-light component at all pixels to pass therethrough as previously discussed with reference to FIGS. 6 and 7. When image capturing is performed under natural infrared light, or when image capturing is performed with the infrared light projector 101 projecting infrared light, each image is thus captured with the infrared-light component received at all pixels. The resulting image is thus output as an infrared light image 202.

The filters of FIG. 6 for the image sensor 111 include an ultraviolet cut filter (ALL) cutting off only ultraviolet light. Only an all mosaic image 131 is extracted and then interpolated by the interpolation processor 132. The ALL signal is thus generated for all pixels. An all (visible light and infrared light) image 203 having all wavelengths containing the infrared light is thus generated.

The filters of FIG. 6 for the image sensor 111 include infrared light transmissive filter (IR). Only an IR mosaic image 141 is extracted. A decoder 142 decodes the extracted IR mosaic image 141 in accordance with a predetermined algorithm to generate communication data 204. In this case, the imaging device 100 functions as receiving means for infrared light communications. Using ALL and IR images only, a black-and-white image with the infrared light removed therefrom can be generated in an arrangement (not shown).

The infrared light projector 101 helps capture an infrared light image on a monitoring camera during nighttime, for example. If a low-level visible-light illumination is available, natural infrared light or illumination of the infrared light projector 101 may be used in combination to improve mosaic accuracy level or achieve noise reduction effectiveness. If the visible-light illumination level is extremely low, a black-and-white image or an ALL image may be output alone or together with the color image.

The color filter of FIG. 6 composed of the long-pass filters has been discussed. A variety of arrays are available in addition to the array of FIG. 6. For example, the ultraviolet cut filter (ALL) is used in the example of FIG. 6. The same process as described above may be performed with the ultraviolet cut filter (ALL) replaced with all wave transmissive filter not cutting off ultraviolet light.

Even if the Ye+IR pixel and the ALL pixel are interchanged with each other as shown in FIG. 10, the advantage of the device remains unchanged with only a detailed portion in a demosaic algorithm becoming different. In the color filter array of FIG. 10, the budget of sixteen pixels (4×4) is four pixels for the ultraviolet light cut or all wave transmissive filter (ALL), eight pixels for the yellow light filter (Ye+IR), two pixels for the red light filter (R+IR) and two pixels for the infrared light transmissive filter (IR).

All r, g and b components can be acquired from ALL signal, and since Ye=g+r, precise data regarding green (g) is acquired from many pixels. With that array, definition of green (g) can be increased.

The same advantage is provided if the ratio of pixels is changed as shown in FIG. 11. In a color filter array of FIG. 11, the budget of sixteen pixels (4×4) is four pixels for the ultraviolet light cut or all wave transmissive filter (ALL), four pixels for the yellow light filter (Ye+IR), four pixels for the red light filter (R+IR) and four pixels for the infrared light transmissive filter (IR).

With that color filter array, approximately uniform data is obtained for all r, g and b components, and definition of the colors r, g and b are set to be substantially uniform.

In each of the above embodiments, equations (6)-(9) are used to calculate RGB components with the infrared-light component removed therefrom. The same process is also applicable to acquire color information regarding cyan and yellow. A long-pass filter having a small ripple in the passband and the cutoff band thereof can also be used. In this case, the effect of the ripple causes an error, but the error attributed to a small ripple in transmittance is typically negligibly small. Such a filter thus provides substantially the same advantage.

With the imaging device and the image processing method in accordance with embodiments of the present invention, the color filter includes a plurality of different long-pass filters permitting the infrared light to pass therethrough. The infrared-light component is precisely removed based on the property of the long-pass filters providing substantially uniform transmittance within the infrared light range. A high-quality color image with excellent color reproduction property thus results.

The advantages of the embodiments of the present invention are listed as below.

The image sensor operates with the color filter array composed pixels of the long-pass filters only or the color filter array composed pixels of the long-pass filter and pixels of no filter at all. The transmittance characteristics of the infrared-light component thus become substantially equal or analogous to each other throughout all RGB channels. Without using an external infrared light cut filter, the infrared-light component is precisely removed through the imaging process.

The infrared-light component entering the image sensor is removed through the imaging process. The image sensor thus provides an image containing the infrared light and a color image containing no infrared-light component and having excellent color reproduction property. An additional function such as light communication using the infrared light emitted on a real-time basis is performed while the color image having excellent color reproduction property is provided at the same time.

The demosaic process to increase definition is performed using a high signal-to-noise (S/N) signal containing an infrared-light component. Precision of an edge direction detection in the demosaic process is heightened. As a result, an interpolation direction in the interpolation process interpolating a deficient pixel is increased in accuracy. The interpolation direction accuracy improvement is achieved by performing the infrared light removal process subsequent to the demosaic process with the color reproduction property maintained.

A noise reduction process is performed on images using a high S/N signal containing an infrared-light component. The edge detection accuracy for noise reduction is thus increased. As a result, the noise reduction is performed in a manner such that an edge border in the edge preserving filter is not disturbed by noise. The infrared-light component removal process is performed subsequent to or prior to the noise reduction process. Both an excellent color reproduction property and an effective noise reduction are achieved at the same time.

The function of removing the infrared-light component entering the image sensor is performed through the image process of the infrared component remover 123 of FIG. 9. Whether to execute the image process of the infrared component remover 123 may be electronically switched. If the use of the infrared light is switched between daytime and nighttime on the monitoring camera for example, no mechanical switching of the infrared light cut filter is required. A mechanism for disabling and enabling the infrared light cut filter becomes unnecessary, leading to cost reduction. Since no wear takes place on such a mechanical portion, the image sensor remains robust in service.

The infrared-light component entering the image sensor is removed in the image process. In an application in which one of an infrared light projector and an infrared flash is used, light non-uniformity in a light beam from one of the infrared light projector and the infrared light flash is cancelled.

The color filter arrays of FIGS. 6, 10 and 11 contain ALL pixels permitting all RGB wavelengths to pass therethrough and many Ye pixels receiving R and G light. For example, such a color filter array contains ALL pixels or Y pixels in a checkered pattern. A lot of more information is acquired, resulting in a high-definition image.

The process steps described above may be executed using hardware, software, or a combination of both. If the process steps are executed using software, a computer program of a process sequence of the process steps may be installed on a memory in a computer built in dedicated hardware, or installed on a general-purpose computer performing a variety of processes. The computer program may be pre-recorded on a recording medium. The computer program may be then installed onto the computer. The computer program may be received via a network such as a local area network (LAN) or the Internet and then installed onto an internal recording medium such as a hard disk in the computer.

The process steps may be performed in a time-series sequence stated as above. Alternatively, the process steps may be performed in parallel or separately as necessary or depending on throughput of each apparatus. The word system in this specification refers to a logical set of a plurality of apparatuses and elements of one apparatus are not necessarily housed in the same casing of the apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus, comprising:
an image sensor and an infrared component remover,
the image sensor receiving light through a color filter, the color filter including long-pass filters only or a combination of a long-pass filter and an all-transmissive filter, the long-pass filters including a visible-light transmissive long-pass filter for permitting a visible-light component and an infrared-light component to pass therethrough and an infrared-light transmissive long-pass filter for permitting an infrared-light component to pass selectively therethrough, and
the infrared-light component remover removing an infrared-light component contained in a signal having passed through the visible-light transmissive long-pass filter, with transmittance data of an infrared-light region of the visible-light transmissive long-pass filter and the infrared-light transmissive long-pass filter applied.

2. The video signal processing apparatus according to claim 1, wherein the infrared-light component remover calculates a parameter that reduces to approximately zero the infrared-light component contained in the signal having passed through the visible-light transmissive long-pass filter, with the transmittance data of the infrared-light region of the visible-light transmissive long-pass filter and the infrared-light transmissive long-pass filter applied, and generates, with the calculated parameter applied, a color signal being a visible-light component that is obtained by removing the infrared-light component from the signal having passed through the visible-light transmissive long-pass filter.

3. The video signal processing apparatus according to claim 1, wherein each of the visible-light transmissive long-pass filter and the infrared-light transmissive long-pass filter, forming the color filter, has a substantially constant transmittance in the infrared-light region.

4. The video signal processing apparatus according to claim 1, wherein the color filter comprises:
a long-pass filter for permitting light in a visible-light region and an infrared-light region to pass therethrough with only an ultraviolet-light component cut off;
a long-pass filter for permitting light in the visible-light region equal to or longer than a yellow light wavelength and the infrared-light region to pass therethrough;
a long-pass filter for permitting light in the visible-light region equal to or longer than a red light wavelength and the infrared-light region to pass therethrough; and
an infrared-light transmissive long-pass filter for permitting light mainly in the infrared-light region to pass therethrough.

5. The video signal processing apparatus according to claim 1, wherein the color filter comprises:
an all-transmissive filter for permitting light in a visible-light region and an infrared-light region to pass therethrough;
a long-pass filter for permitting light in the visible-light region equal to or longer than a yellow light wavelength and the infrared-light region to pass therethrough;
a long-pass filter for permitting light in the visible-light region equal to or longer than a red light wavelength and the infrared-light region to pass therethrough; and
an infrared-light transmissive long-pass filter for permitting light mainly in the infrared-light region to pass therethrough.

6. The video signal processing apparatus according to claim 1, further comprising a demosaic processor for demosaicing a mosaic image output from the image sensor,
wherein the infrared-light component remover receives demosaic data generated by the demosaic processor and generates for each pixel a color signal containing a visible-light component with the infrared-light component removed therefrom.

7. The video signal processing apparatus according to claim 1, further comprising an interpolator for generating an image containing a visible-light component and an infrared-light component by interpolating a mosaic image generated from transmission data of the visible-light transmissive long-pass filter contained in the color filter.

8. The video signal processing apparatus according to claim 1, further comprising a decoder for generating infrared-light communication data by decoding a mosaic image generated from transmission data of the infrared-light transmissive long-pass filter contained in the color filter.

9. An image sensor for receiving light through a color filter, the color filter comprising long-pass filters only or a combination of a long-pass filter and an all-transmissive filter, the long-pass filters including a visible-light transmissive long-pass filter for permitting a visible-light component and an infrared-light component to pass therethrough and an infrared-light transmissive long-pass filter for permitting an infrared-light component to pass selectively therethrough; and
wherein, when a signal has passed through the visible-light transmissive long-pass filter, an infrared-light component is configured to be removed therefrom, with transmittance data of an infrared-light region of the visible-light transmissive long-pass filter and the infrared-light transmissive long-pass filter applied.

10. The image sensor according to claim 9, wherein each of the visible-light transmissive long-pass filter and the infrared-light transmissive long-pass filter, forming the color filter, has a substantially constant transmittance in the infrared-light region.

11. The image sensor according to claim 9, wherein the color filter comprises:
a long-pass filter for permitting light in a visible-light region and an infrared-light region to pass therethrough with only an ultraviolet-light component cut off;
a long-pass filter for permitting light in the visible-light region equal to or longer than a yellow light wavelength and the infrared-light region to pass therethrough;
a long-pass filter for permitting light in the visible-light region equal to or longer than a red light wavelength and in the infrared-light region to pass therethrough; and
an infrared-light transmissive long-pass filter for permitting light mainly in the infrared-light region to pass therethrough.

12. The image sensor according to claim 9, wherein the color filter comprises:
an all-transmissive filter for permitting light in a visible-light region and an infrared-light region to pass therethrough;
a long-pass filter for permitting light in the visible-light region equal to or longer than a yellow light wavelength and the infrared-light region to pass therethrough;
a long-pass filter for permitting light in the visible-light region equal to or longer than a red light wavelength and the infrared-light region to pass therethrough; and
an infrared-light transmissive long-pass filter for permitting light mainly in the infrared-light region to pass therethrough.

13. A video signal processing method of a video signal processing apparatus, comprising steps of:
receiving, on an image sensor, light through a color filter, the color filter including long-pass filters only or a combination of a long-pass filter and an all-transmissive filter, the long-pass filters in the color filter including a visible-light transmissive long-pass filter for permitting a visible-light component and an infrared-light component to pass therethrough and an infrared-light transmissive long-pass filter for permitting an infrared-light component to pass selectively therethrough; and
removing an infrared-light component contained in a signal having passed through the visible-light transmissive long-pass filter, with transmittance data of an infrared-light region of the visible-light transmissive long-pass filter and the infrared-light transmissive long-pass filter applied.

14. The video signal processing method according to claim 13, wherein the step of removing the infrared-light component comprises:

calculating a parameter that reduces to approximately zero the infrared-light component contained in the signal having passed through the visible-light transmissive long-pass filter, with the transmittance data of the infrared-light region of the visible-light transmissive long-pass filter and the infrared-light transmissive long-pass filter applied, and generating, with the calculated parameter applied, a color signal being a visible-light component that is obtained by removing the infrared-light component from the signal having passed through the visible-light transmissive long-pass filter.

15. A non-transitory computer-readable storage medium storing a computer program which, when executed by a video signal processing apparatus, causes the video signal processing apparatus to perform a video signal processing method, the method including:

receiving, on an image sensor, light through a color filter, the color filter including long-pass filters only or a combination of a long-pass filter and an all-transmissive filter, the long-pass filters in the color filter including a visible-light transmissive long-pass filter for permitting a visible-light component and an infrared-light component to pass therethrough and an infrared-light transmissive long-pass filter for permitting an infrared-light component to pass selectively therethrough; and removing an infrared-light component contained in a signal having passed through the visible-light transmissive long-pass filter, with transmittance data of an infrared-light region of the visible-light transmissive long-pass filter and the infrared-light transmissive long-pass filter applied.

* * * * *